United States Patent [19]

Gram

[11] Patent Number: 4,535,605
[45] Date of Patent: Aug. 20, 1985

[54] APPARATUS FOR EXTRACTION OF ARTICLES FROZEN IN MOULDS IN A FREEZING MACHINE

[75] Inventor: Klaus Gram, Vojens, Denmark

[73] Assignee: Brodrene Gram A/S, Vojens, Denmark

[21] Appl. No.: 598,057

[22] Filed: Apr. 9, 1984

[30] Foreign Application Priority Data

Apr. 14, 1983 [DK] Denmark .............................. 1640/83

[51] Int. Cl.³ .............................................. A23G 9/00
[52] U.S. Cl. ........................................ 62/345; 62/353;
414/416; 414/564; 425/436 R
[58] Field of Search .................. 62/345, 353; 414/416,
414/564, 592; 425/126 S, 436 R

[56] References Cited

U.S. PATENT DOCUMENTS

| | | | |
|---|---|---|---|
| 1,480,703 | 1/1924 | Ward | 62/353 X |
| 3,077,271 | 2/1963 | Siempelkamp | 414/592 X |
| 3,696,948 | 10/1972 | Murdoch et al. | 414/564 |
| 3,700,120 | 10/1972 | Romick et al. | 414/564 |
| 3,763,661 | 10/1973 | Betschart et al. | 62/345 |
| 4,281,953 | 8/1981 | Newnes | 414/564 X |
| 4,335,583 | 6/1982 | Billett | 62/345 |
| 4,396,367 | 8/1983 | Gram | 62/353 X |

FOREIGN PATENT DOCUMENTS 10944 of 1904 United Kingdom .................. 62/353

Primary Examiner—William E. Tapolcai
Attorney, Agent, or Firm—Watson, Cole, Grindle & Watson

[57] ABSTRACT

An apparatus for extraction of articles frozen in moulds in a freezing machine, comprises means for insertion of retaining means in the moulds for engagement with the articles. The apparatus further comprises means for lifting the retaining means for extraction of the articles. The retaining means for each mould comprise at least two plate sections adapted for insertion in a mould along the inner surfaces of two side walls of the latter facing each other. The plate sections ensure that the subject article is firmly gripped for extraction.

5 Claims, 9 Drawing Figures

APPARATUS FOR EXTRACTION OF ARTICLES FROZEN IN MOULDS IN A FREEZING MACHINE

BACKGROUND OF THE INVENTION

The present invention relates to an apparatus for extraction of articles frozen in moulds in a freezing machine, the apparatus comprising means for inserting retaining means in the moulds for engagement with the articles and means for lifting the retaining means for extraction of the articles.

In apparatus of the type referred to here it is known to use as retaining means sticks for ice lollies, such sticks being inserted in the material filled into the moulds, and after freezing and partial thawing of the subject ice lollies, the sticks are gripped and the ice lollies extracted from the moulds.

Furthermore, it is known to use as retaining means, extraction means having at the underside therefor. These extraction means are placed on top of the material to be frozen after the latter is filled into the moulds, and during the freezing process of the subject material, the articles in question are frozen onto the underside of the extraction means, whereupon the latter are used for extracting the articles after the latter are thawed loose in relation to the moulds. The aforesaid extraction means are not always equally suitable since they have to adhere sufficiently to the subject articles to be able to lift same, while at the same time the thawing loose of the articles in relation to the moulds must not cause the extraction means to lose their firm grip on the frozen articles.

SUMMARY OF THE INVENTION

The apparatus according to the present invention is characterized in that the retaining means for each mould comprise at least two plate sections designed for insertion in a mould along the inner surfaces of two opposing outer side walls of the mould. Such at least two plate sections ensure intimate freezing of the plate sections in relation to the subject articles, and the risk of the plate sections being thawed loose with respect to the articles is minimal, being that there is no material between the inside of the moulds and the outside of the plate sections to be thawed out before extracting the articles.

However, to provide even more efficient engagement of the retaining means and the articles as the latter are extracted from the moulds, the lower edge of one plate section may include a retaining flange facing the opposing plate section. This has the advantage of providing at the same time a properly contoured fit between the rataining means and the said articles since the retaining flange will engage a matching groove in the frozen articles, while the latter are prevented form disengagement from the retaining flange, being that the opposing sides of the subject articles are supported by the plate sections there positioned.

To be able to release the retaining flanges from the articles in question after removing the latter from the moulds, the apparatus may according to another embodiment of the invention include a chute pivotal about the axis extending in substantially parallel relationship to the horizontal direction of the plate sections in the extraction position, and being, as seen in the vertical direction, offset laterally in relation to that of the plate sections provided with the retaining flange, the chute being movable from a position in which as seen in the vertical direction it extends laterally of the plate sections to a position in which it extends inclined to be below the plate sections in their raised position. This will enable the chute to perform a rocking movement on the subject articles so as to release the engagement between the retaining flange and the groove produced by same.

According to yet another embodiment of the apparatus, the latter may according to the invention be associated with a conveyor, one end of which is located next to the plate sections, i.e. at the side facing away from the chute, the end of the conveyor being at the same time proximate the lower end of the chute in the inclined position of the latter. This means that in addition to releasing the frozen articles in relation to the plate sections, the chute ensures reliable transfer of the articles released from the plate sections to the conveyor.

To further facilitate release of the plate sections in relation to the frozen articles, the means for lifting the plate sections may according to an additional embodiment of the invention be designed to move the opposing plate sections away from each other after extraction of the articles.

DESCRIPTION OF THE PREFERRED EMBODIMENT

Figure 1A:
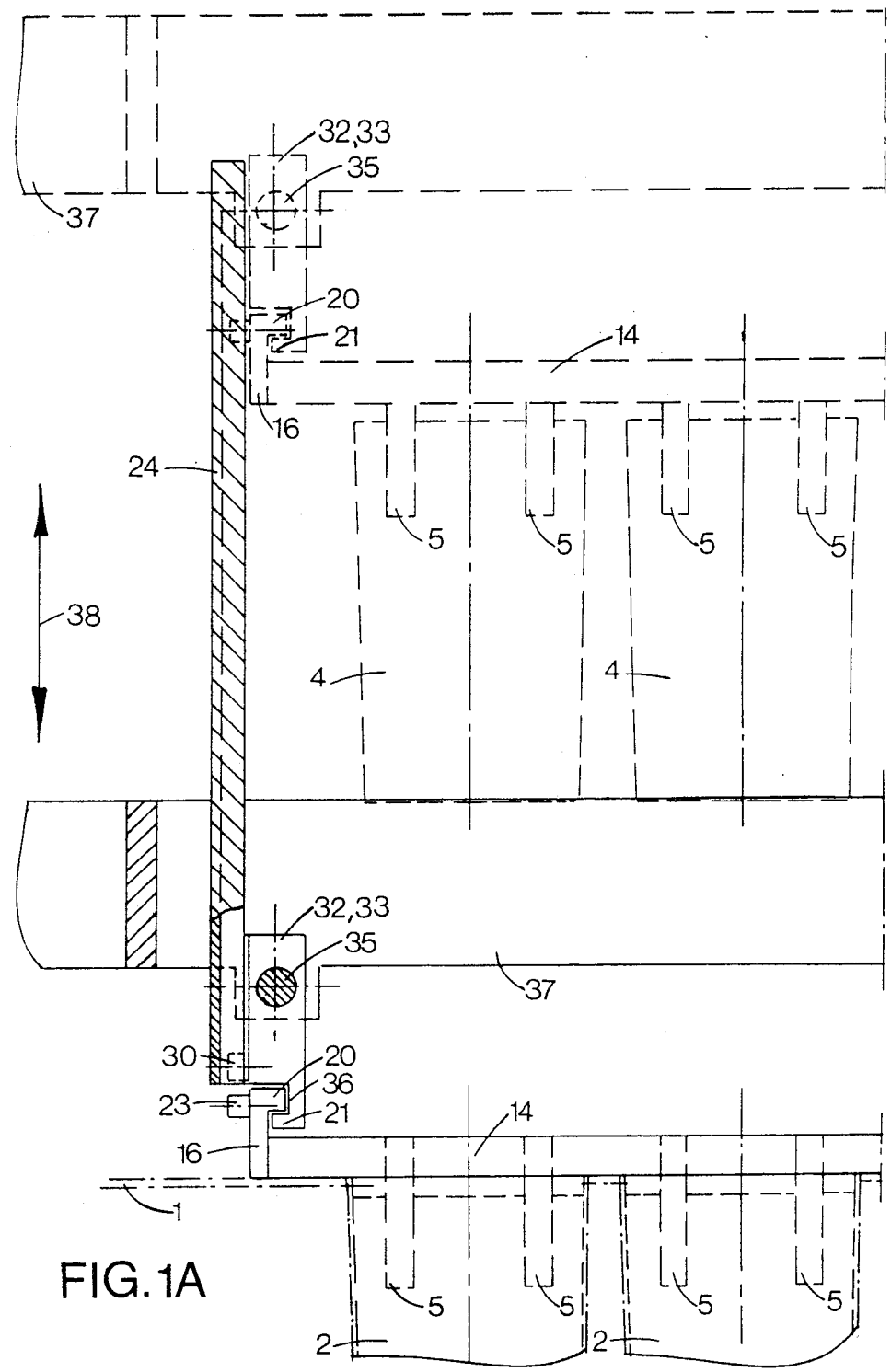
FIGS. 1A and 1B are vertical sectional views of an embodiment of the extraction apparatus according to the invention, taken along the line 1—1 of FIG. 4, omitting several parts for the sake of clarity.
Figure 1B:
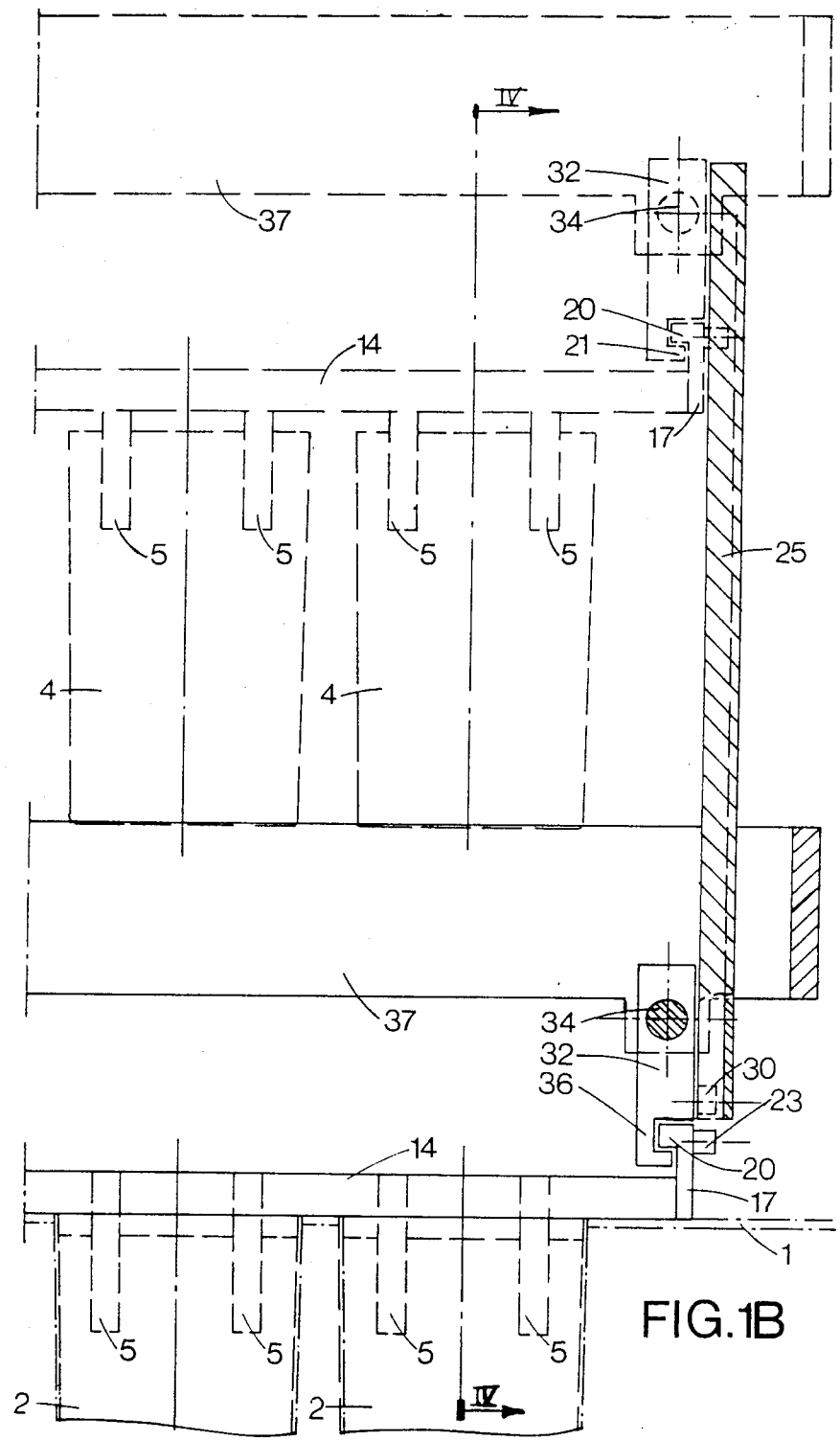
Figure 2A:
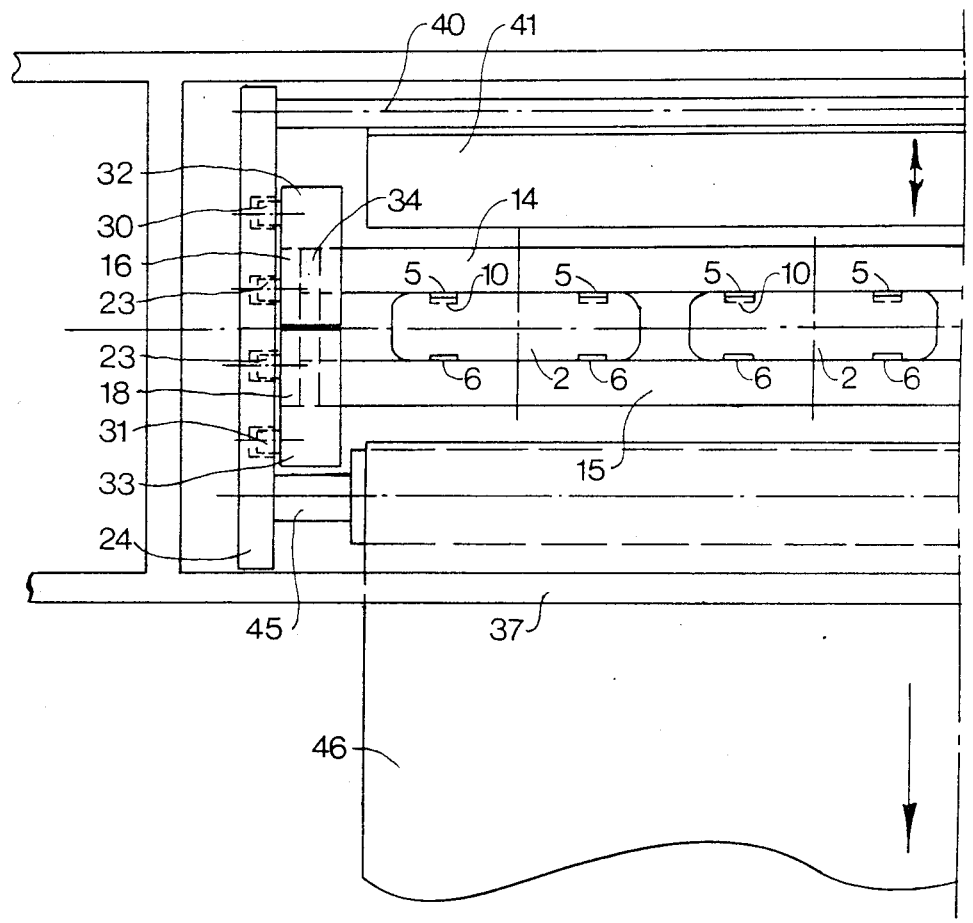
FIGS. 2A and 2B are a top view of the apparatus shown in FIGS. 1A and 1B.

In the drawings 1 designates a freezing mould-supporting part of a freezing machine. This part supports a row of freezing moulds 2, of which FIGS. 1A and 1B shows ony the two extreme moulds of the subject row. The mould-supporting part 1 may be a table for a rotating freezing machine, in which case the subject row of freezing moulds 2 extends radially in relation to the centre of the table and radially in relation to other similar rows of freezing moulds. The mould-supporting part 1, however, may also be incorporated in a freezing machine of the type in which rows of freezing moulds are arranged in parallel relationship. It is characteristic of freezing machines of the type dealt with in this context that they have various stations which the rows of freezing moulds pass during operation of the subject machine. Hence, the mould rows pass a filling station at which the moulds are filled with the material to be frozen, a thawing area in the machine where the frozen articles are thawed loose, and an extraction station for extraction of the articles from the respective moulds. Freezing is usually accomplished by directing a chilled liquid or chilled air to the outside of the freezing moulds. FIGS. 1A, 1B, FIGS. 2A, 2B and FIGS. 4, 5 and 6 illustrate the extraction station of the subject freezing machine. FIG. 3 is a vertical sectional view normal to a row of freezing moulds and through one of these to illustrate the state of the freezing moulds before they arrive at the shown extraction apparatus. The travelling direction of the mould-supporting part 1 is indicated in FIG. 3 by means of an arrow. It will be noted that the freezing mould 2 is filled with a material 4 already frozen to form an article. The freezing mould 2 is subject to engagement on the part of plate sections 5, 6 arranged to the effect that in their inserted position in the mould they are located along the inner surfaces of two opposing side walls thereof, viz. the walls of the freezing mould 2 designated in FIG. 3 by the reference numerals 8 and 9. It will be seen from FIG. 1A, which is a vertical centre section of the aforesaid row of freezing moulds, that each freezing mould accommodates two pairs of plate sections 5, 6. It should be noted, however, to be possible to manage with a single pair of plate sections provided these are of sufficient width and extend far enough down into the respective freezing mould to achieve proper retention of these retaining means in relation to the frozen articles. It will be seen from FIG. 3 that the lower edges of the plate sections 5 which, viewed in the travelling direction 3 of the moulds, extends to the rear include a retaining flange 10 faced toward the opposing plate section 6. This ensures positive engagement of the retaining means 5, 6 with the subject frozen article, viz. in the form of a powerful fitting relationship, as the retaining flanges 10 will engage matching grooves in the frozen articles. It should be noted in this connection that in the embodiment illustrated in the drawing the plate sections 5, 6 are of flat spring steel plate having a thickness of 0.5 mm, and the retaining flanges 10 form an angle of 90° with the principle parts of the plate sections 5.

As will appear from FIG. 3, the upper ends of the plate sections 5, 6 are secured to opposing sides of two bars 14, 15 both ends of which bars being secured to an L-shaped gripper portion. The gripper portions of the bar 14 are shown in FIGS. 1A and 1B and provided with reference numerals 16 and 17. One gripper portion of the bar 15 is best seen in FIG. 3, being provided with the reference numeral 19, while the second gripper portion 18 of the bar 15 is indicated in FIG. 2A. As will be best seen in FIG. 3, each gripper portion is generally of square shape, and in the position of the bars 14 and 15 shown in FIG. 3 the opposing sides of the gripper portions 17 and 18 are in close relationship, thereby providing a spacing between the plate sections 5 and 6 substantially equal to the thickness of the subject freezing moulds 2.

The gripper portions are secured to the ends of the bars 14, 15 in such a manner that the base of the L's is faced upwardly, as will be best seen in FIGS. 1A and 1B insofar as gripper portions 16, 17 are concerned. These bases 20 face each other so as to provide a spacing 21, FIG. 1A, between the bases and the associated bar. At the side facing away from the associated bar each gripper portion is provided with a guide pin 23.

As will be clearly seen in FIGS. 1A-2B, the extraction apparatus itself comprises two end sections 24 and 25 which by means of supports (not shown) in fixed relationship at the extraction station with a spacing slightly exceeding the length of a row of freezing moulds 2. As the two end sections are generally identical, only one end section 25 will be further explained below with particular reference to FIG. 4. Recessed into the inside of the end section are four guide grooves 26, 27, 28 and 29 extending in parallel relationship along their lower length but arranged in diverging pairs at their upper ends, as indicated at 26', 27', 28' and 29'. Of these the inner guide grooves 27, 28 serve to accommodate the guide pins 23 of a pair of bars 14, 15 when the frozen articles 4 in a corresponding row of freezing moulds 2 are to be extracted. The grooves 26, 29 serve to guide pine 30, 31 arranged on respective guide blocks 32, 33. These guide blocks 32, 33 are slidably mounted on a supporting bar 34 extending transversely of the upper portions of the guide grooves 26, 27, 28 and 29. One guide block 32 is clearly shown in FIG. 1B, from which will be noted that at its base and the side facing the associated end section 25 it has a lateral recess 36 for accomodating the base 20 of the shown gripper portion 17.

As stated, the second end section 24 is substantially identical to the end section 25, being thus provided with guide grooves for two guide blocks which are likewise slidably mounted on a supporting bar 35, as shown in FIG. 1A.

Figure 2B:
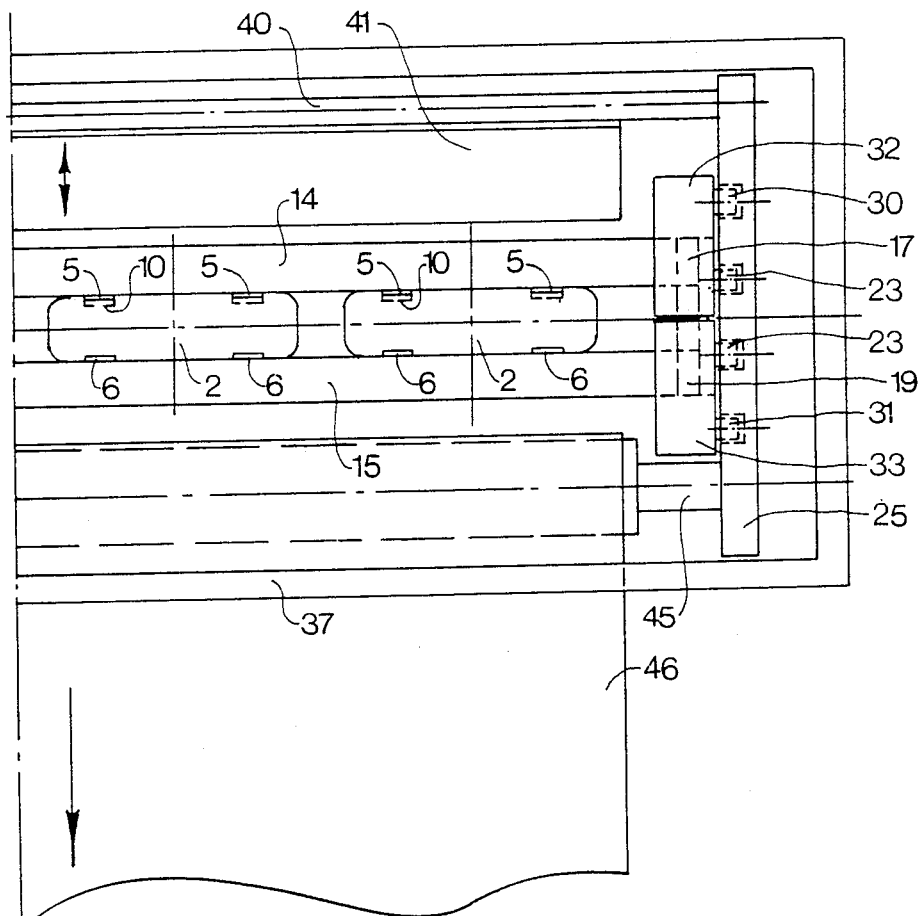
Figure 3:
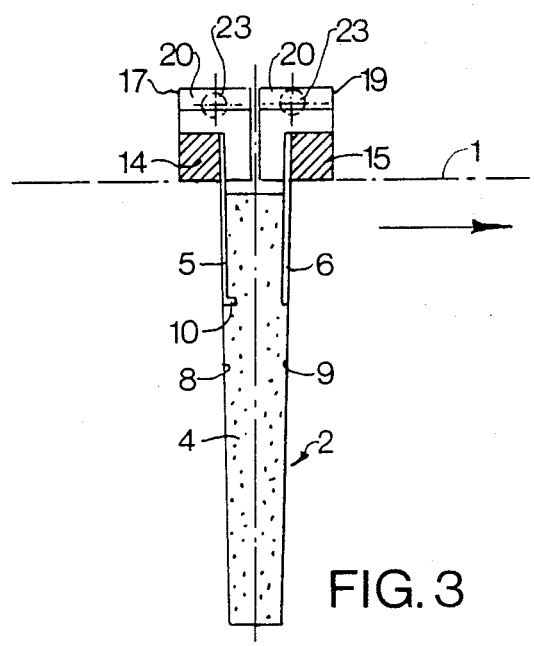
FIG. 3 is a vertical section view of a freezing mould containing a frozen article before extraction thereof.

The two supporting bars 34 and 35 are supported by a rectangular frame 37 enclosing the two end sections 24 and 25, as will be apparent from FIG. 2A and FIG. 2B. By means of not shown actuating means this frame 37 is movable upwardly from the position indicated in FIGS. 1A, 1B by fully drawn lines to a position in which said frame is indicated by dotted lines at the top of FIGS. 1A, 1B, as shown by means of the double arrow 38 in FIG. 1A.

Figure 4:
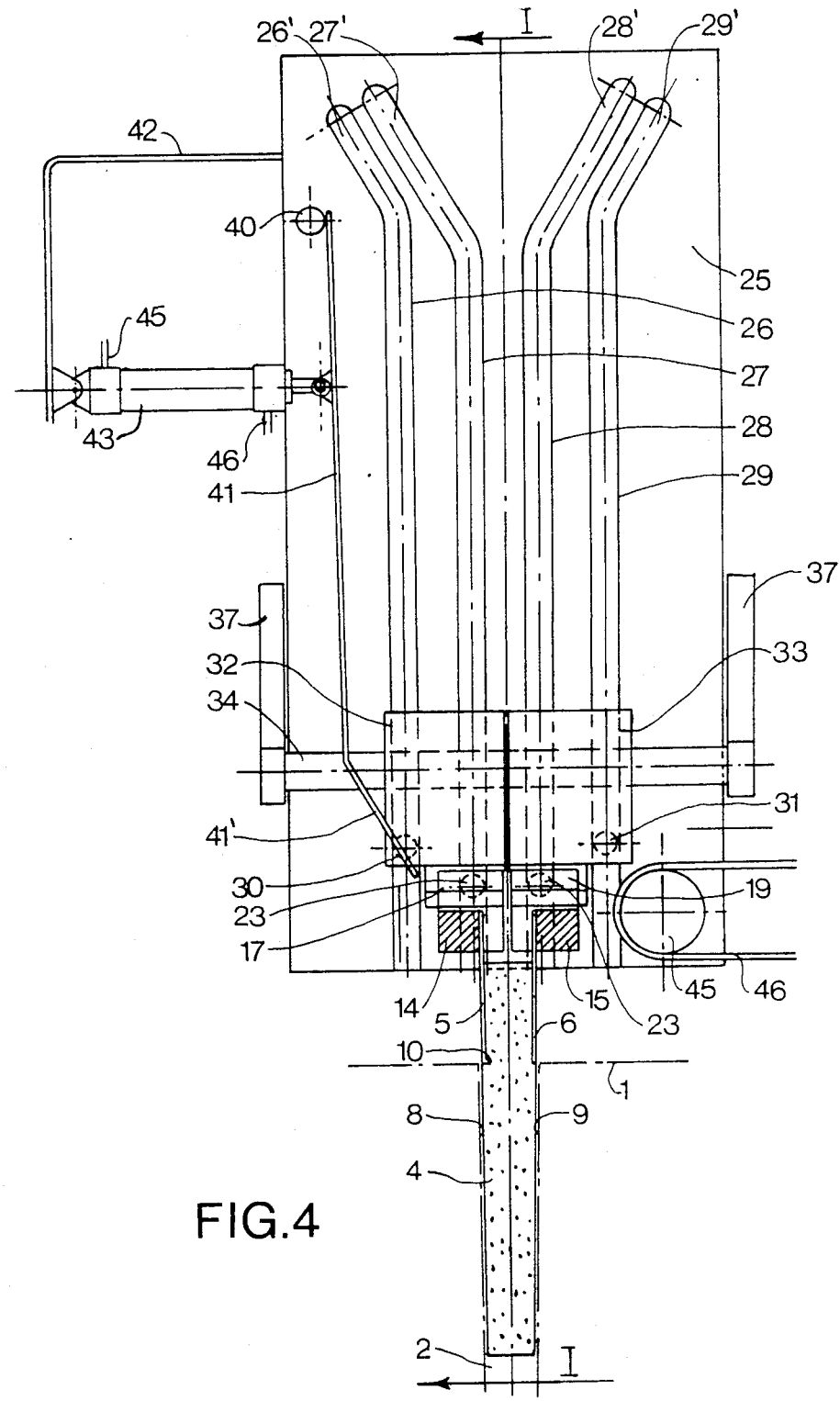
FIG. 4 is a sectional view taken along the line IV—IV of FIG. 1b, showing a frozen article partially disengaged from its mould.
Figure 5:
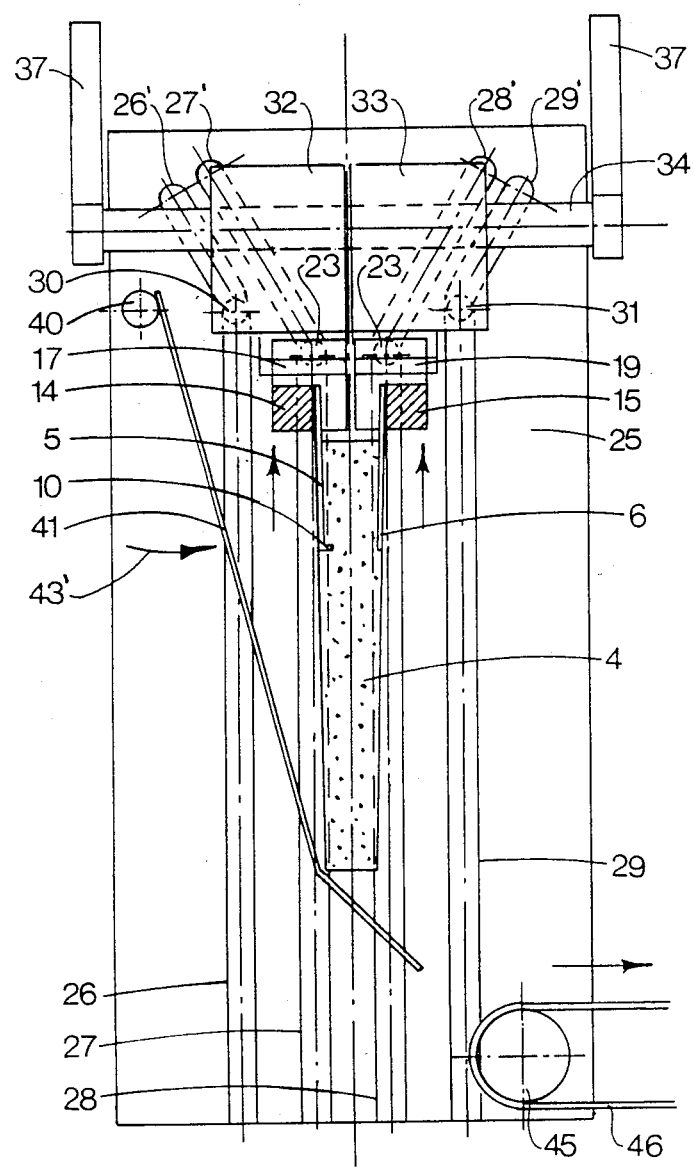
FIG. 5 is a view corresponding to FIG. 4, except that it illustrates a later stage of the extraction process.
Figure 6:
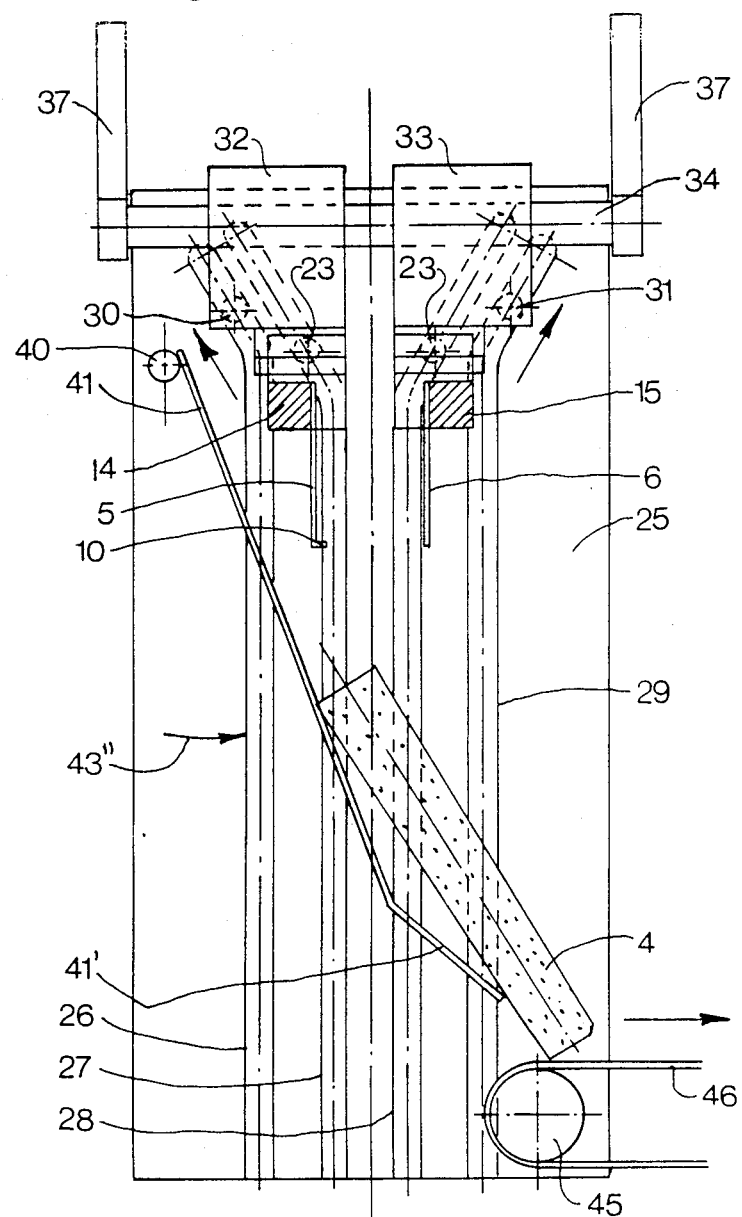
FIG. 6 is a view corresponding to FIGS. 4 and 5 for illustrating a yet later stage of the extraction process.

As will appear from FIGS. 2A, 2B, the end sections 24 and 25 are interposed by a shaft 40 pivotally mounted in the end sections and supporting a plate-like chute 41. For the sake of clarity, this shaft with associated chute is not shown in FIGS. 1A and 1B, whereas its cross-sectional shape clearly appears from FIGS. 4, 5 and 6. For pivoting the chute 41 there is arranged between a bracket 42, secured to the end section 25, and the chute 41, a piston mechanism 43 which may be operated pneumatically through schematically shown pipings, 45, 46. For the sake of clarity, said piston mechanism 43 is shown only in FIG. 4, but its mode of operation is indicated in FIGS. 5 and 6 by means of arrows 43' and 43". By comparing FIG. 4 and FIG. 6, it will thus be noted that the chute 41 is pivotal from a position in which, it seen in the vertical direction, is located next to a pair of bars 14, 15 in the extraction position of the latter to the chute or guiding position shown in FIG. 6.

As illustrated in FIGS. 2A and 2B, the end sections 24 and 25 furthermore serve to support a shaft 45 serving as terminal turning roller for a conveyor which in the embodiment illustrated in the drawing is a belt conveyor whose conveyor belt is designated 46. It will be noted from FIG. 6 that the lower edge of the chute 41 in the position shown in proximate the end of said conveyor.

The extraction apparatus illustrated operates as follows:

As a row of freezing moulds 2 arrive at the extraction apparatus, the articles 4 contained in the moulds are thawed loose in relation to the moulds 2, and the parts assume the position shown in FIG. 3, in which the guide pins 23 of the gripper portions 14, 15 have an interspacing corresponding to the spacing between the guide grooves 27, 28 and the end section 25, and it will be understood, of course, that the guide pins 23 of the gripper portions 16, 18 located at the opposite end of the two bars 14 and 15 will likewise have an interspacing corresponding to the similar grooves in the end section 24. The rows of moulds 2 are advanced stepwise, and these steps are adjusted to the effect that at the completion of such a stepwise movement a row moulds 2 will at that very moment be located between the two end sections 24, 25 and to the effect that the guide pins 23 of the gripper portions will at that very moment be located under the lower ends of the guide grooves 27, 28 in the two end sections. At the same time, the elevation of the gripper blocks 32, 33 in the lower position of the frame 37 is adjusted to the effect that in the end phase of the stepwise movement the bases 20 of the gripper portions are moved laterally into the side recesses 36 of the gripper blocks. This position is shown in FIGS. 1A, 1B. Now the frame 37 is raised with the effect that the shafts 34 and 35 will move the guide blocks 32 and 33 upwardly. By means of their guide pins 30, 31 the blocks will be guided in the guide grooves 26, 29 in the end sections, and at the same time the guide blocks will pull the guide pins 23 of the gripper portions into the guide grooves 27 and 28. In short, this results in a guided raising movement of the two respective bars 14, 15 and of the associated plate sections 5, 6 which will carry along the frozen articles 4 from the subject row of moulds 2. Such a beginning raising movement is shown in FIG. 4. As the raising movement of the frame 37 continues, see FIG. 5, the lower ends of the articles 4 will be raised to pass the lower edge of the chute 41, and the latter is pivoted, as indicated by the arrow 43' in FIG. 5, to take up a position below the subject article and under the plate sections 5, 6. As the upward movement progresses, see FIG. 6, the guide blocks 32, 33 will be forced away form each other due to the diverging upper ends 26' and 29' of the guide grooves for the guide pins 30, 31. This will also cause the bars 14, 15 to be separated as their guide pins 23 will follow the diverging ends 27' and 28' of the respective guide grooves. At the same time, the chute 41 will be subject to further pivotal movement, see the arrow 43'' in FIG. 6, and the frozen articles 4, which have been disengaged from the associated row of moulds 2, will now be transferred to the conveyor 45, 46 for carrying the articles 4 away from the extraction apparatus.

From the above explanation it will be understood that the chute 41 is pivoted in the same direction as the orientation of the retaining flanges 10. This means at the same time that the articles 4 will be pivoted to clear said retaining flanges. Conducive thereof is also the fact that the lower portion 41' of the chute 41 is slightly bent toward the conveyor to ensure that the lower end of the articles 4 are first encountered by the chute, however, not until the latter has been pivoted to the extent that the articles are safely tranferred to the conveyor.

Figure 7:
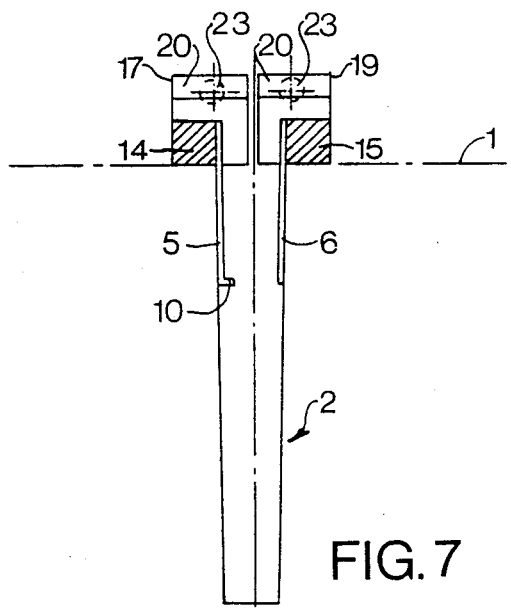
FIG. 7 is a vertical sectional view of a freezing mould after completed extraction process.

After completed transfer, the chute 41 is returned to its initial position, and the frame 37 is likewise lowered to its initial position. This will cause the plate sections 5, 6 to be moved back to their initial position, meaning that they will have an interspacing substantially corresponding to the thickness of the subject moulds 2, see FIG. 4, and the bars 14, 15 will be rested on the top of the freezing mould-supporting part 1, thereby causing the plate sections 5, 6 to assume their proper position in the moulds. At initiation of the next cycle of the subject freezing machine, the bases 20 of the gripper portions are moved out from the side recesses 36 in the guide blocks 32, 33, and the state illustrated in FIG. 7 is now reached. Now the subject row of freezing moulds 2 is ready to receive another charge of the material to be frozen, whereupon the sequence of operations explained above may be repeated, of course, with respect to the next row of freezing moulds.

In the embodiment outlined above of the extraction apparatus according to the invention the apparatus is stated to be arranged in fixed relationship at the extraction station, i.e. at the point where a row of freezing moulds stops after freezing and thawing loose having taken place. Such an embodiment lends itself to freezing apparatus in which the rows of moulds are moved in parallel relationship, i.e. following a linear path. If the freezing apparatus is of the type having a rotary freezing table carrying the moulds, such fixed arrangement may be unsuitable as the conveyor 45, 46 referred to above will thus cover part of the table. In such case it may be expedient to suspend the extraction apparatus so as to be pivotal to a position where the articles extracted are outside the circumference of the table. In this case the whole apparatus may be suspended from a lever which is pivotally mounted horizontally, about a vertical axis outside the circumference of the table. In this embodiment of the apparatus according to the invention extraction is performed in two steps, whereby the extraction operation is interrupted when the parts are in the position shown in FIG. 5, i.e. while the articles extracted are still held between the plate sections 5, 6 and before the chute 41 has been caused to engage with the subject articles. In this position the whole extraction apparatus is moved outside the area of the freezing moulds, and upon reaching a desired delivery position, the last step of the upward movement of the frame 37 is performed until the parts assume the position shown in FIG. 6, and delivery is effected. In the latter case, as will be appreciated, there is no need for a conveyor reaching over the freezing table.

It will also be appreciated that in the latter case a freezing machine may have a plurality of extraction apparatus which are moved successively to the extraction position and being likewise advanced in succession to the point where delivery is to take place. In the latter case the design will be the effect that as one extraction apparatus is moved away from the extraction position, the next extraction apparatus is advanced to said position while the subject row of moulds is at a standstill. Consequently, it is not a prerequisite of the present invention that each row of freezing moulds should have its own pair of bars 14, 15 with associated plate sections 5, 6.

I claim:

1. An apparatus for extraction of articles frozen in rows of moulds in a freezing machine, said apparatus comprising means for inserting retaining means in the moulds for engagement with said articles and means for lifting said retaining means for extraction of the articles, wherein the retaining means for a row of moulds comprise two rows of plate sections designed for insertion along the inner surface of two opposing outer side walls of the moulds of the row of moulds concerned, the lower edges of the plate sections of one of said rows of plate sections including a retaining flange facing the opposing plate sections of the other of said rows of plate sections, said apparatus, moreover, comprising a chute pivotal about an axis extending in substantially parallel relationship to the longitudinal direction of said rows of plate sections in the extraction position, and being, as seen in the vertical direction, offset laterally in relation to that of the rows of plate sections provided with retaining flanges, actuating means being provided for moving said chute from a first position in which it, as seen in the vertical direction, extends laterally of the two rows of plate sections concerned and to a second position in which it extends inclined with the lower end of said chute positioned below the rows of plate sections concerned in their lifted position.

2. An apparatus as claimed in claim 1, wherein the apparatus is associated with a conveyor, one end of which is located next to the rows of plate sections concerned and at the side facing away from the chute, said one end of the conveyor being at the same time proximate the lower end of the chute in said second position of the latter.

3. An apparatus as claimed in claim 1, wherein means are provided for moving the two rows of plate sections concerned away from each other after extraction of the articles supported by said plate sections.

4. An apparatus for extraction of articles frozen in rows of moulds in a freezing machine, said apparatus comprising means for inserting retaining means in the moulds for engagement with said articles and means for lifting said retaining means for extraction of the articles, wherein the retaining means for a row of moulds comprise two rows of plate sections designed for insertion along the inner surfaces of two opposing outer side walls of the moulds of the row of moulds concerned, the lower edges of the plate sections of one of said rows of plate sections including a retaining flange facing the opposing plate sections of the other of said rows of plate sections, said apparatus, moreover, comprising a chute pivotal about an axis extending in substantially parallel relationship to the longitudinal direction of said rows of plate sections in the extraction position and being, as seen in the vertical direction, offset laterally in relation to that of the rows of plate sections provided with retaining flanges, actuating means being provided for moving said chute from a first position in which it, as seen in the vertical direction, extends laterally of the two rows of plate sections concerned and to a second position in which it extends inclined with the lower end of said chute positioned below the rows of plate sections concerned in their lifted position and wherein the upper ends of the plate sections of each of said rows of plate sections are secured to a bar, both ends of said bars being provided with means for engagement with guide means provided in said apparatus, said guide means being adapted for guiding said bars so that they are first travelling in parallel relationship and then separated from each other.

5. An apparatus as claimed in claim 4, wherein said actuating means for moving said chute is synchronized with the vertical movement of said bars to the effect that the chute is moved to said second position during the end phase of the upward movement of said bars.

* * * * *